Figure 1:
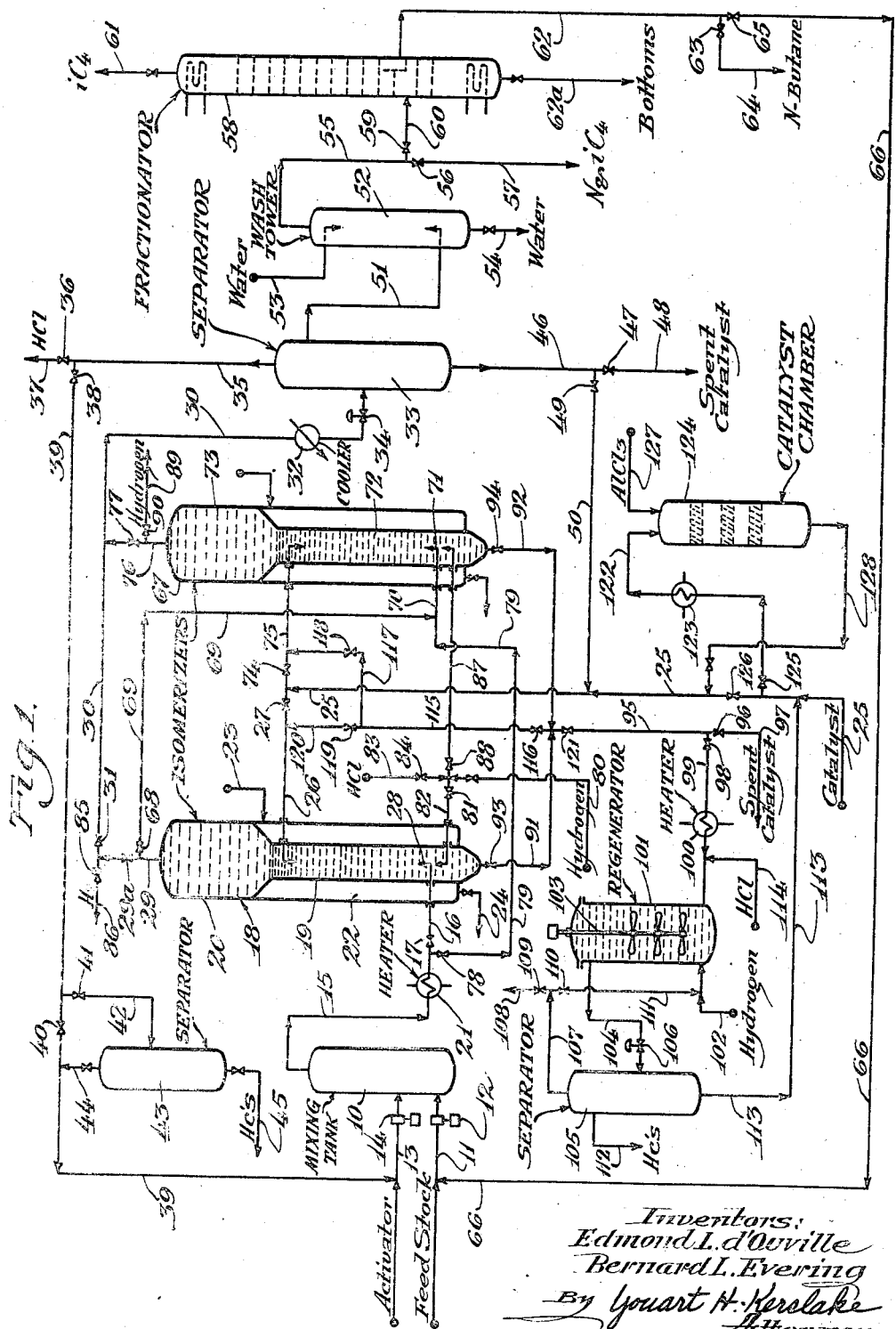

Patented Oct. 15, 1946

2,409,260

UNITED STATES PATENT OFFICE 2,409,260

BUTANE ISOMERIZATION

Edmond L. d'Ouville and Bernard L. Evering, Chicago, Ill., assignors to Standard Oil Company, Chicago, Ill., a corporation of Indiana Application June 24, 1943, Serial No. 492,040

13 Claims. (Cl. 260—683.5)

This invention relates to the production of isobutane from normal butane and more particularly relates to the isomerization of normal butane and hydrocarbon fractions containing a large proportion thereof into products consisting substantially of isobutane in the presence of a specific liquid catalyst of the aluminum chloride type.

The present application is a continuation-in-part of our copending applications, Serial No. 422,983-4, filed December 15, 1941, which in turn are continuations-in-part of applications which have now matured into Letters Patent 2,266,011-2.

Isobutane has in recent years assumed increased importance as a basic or starting material for the preparation of valuable hydrocarbon products, as well as in the synthesis of many chemical compounds. Isobutane can be alkylated, for example, with olefins such as propylene, butylene, or other low boiling unsaturated hydrocarbons, or it can be dehydrogenated to isobutylene thermally or over catalysts such as chromic oxide gel or magnesium chromite and the isobutylene polymerized by known means to resins, lubricating oils, or diisobutylene. The latter compound is easily converted to so-called isooctane by hydrogenation and forms a convenient source of this valuable product for use as premium or aviation fuels.

The conversion of normal butane to isobutane has been investigated to a considerable extent and many processes have been proposed using aluminum chloride as the catalyst. These processes although adopted commercially are subject to many operational difficulties which make them relatively inefficient. In addition the complicated equipment required results in unusually high installation costs. Prominent among these processes are those which make use of supported aluminum chloride as catalyst. The principal difficulty inherent in these processes results from the fugitive character of the catalyst. The aluminum chloride is not retained permanently on the support but on account of its appreciable vapor pressure is carried along with the effluent hydrocarbon vapor. Many devices have been tried to prevent the escape of the aluminum chloride into lines where plugging can result or into equipment the efficiency of which or even the operability of which can be seriously affected. For example, beds of clay have been placed down stream from the catalyst chamber to adsorb the aluminum chloride from the effluent hydrocarbon. An alternate method has been to make use of alternate layers of supported aluminum chloride and clay. Although these devices are effective they are but temporary expedients and as such require intermittent operation, thus precluding continuous operation.

Another difficulty inherent in processes using supported aluminum chloride results from the continuous drop in activity due to the loss of catalyst from the support. Thus with constant feed rate a constantly diminishing conversion results. This change in activity can be compensated for by varying the activator concentration so that the activator concentration is lowest at the highest catalyst activity and highest for the minimum catalyst activity for the cycle. This is objectionable since it does not permit the continuous use of the optimum activator concentration. In practical operation it has been found more feasible to allow the conversion to fluctuate between use of the optimum activator concentration in predetermined limits giving an average conversion measurably below the potential conversion of the given equipment. Since aluminum chloride has an appreciable solubility in liquid butane, operation with supported catalysts is restricted to vapor phase operation. Again since the isomerization reaction is exothermic and since supported catalyst makes use of ceramic and clay type supports which are notoriously poor conductors of heat, special devices are necessary to dissipate the heat of reaction. Finally, since solid aluminum chloride is extremely susceptible to olefins and higher hydrocarbons special and expensive precautions are necessary to prepare a feed stock which will not change the physical state of the supported aluminum chloride, thus reducing the active surface causing early depletion of the activity of the catalyst.

We have found that excellent yields of isobutane can be obtained from normal butane with unusually long catalyst life by subjecting it at comparatively moderate temperatures and pressures to the action of a special liquid catalyst of the aluminum chloride complex type in the presence of an activator.

It is an object of our invention to provide an improved process for the production of isobutane from normal butane and hydrocarbon fractions containing large proportions of normal butane. Another object is to provide an economical method of preparing a product consisting substantially of isobutane by the isomerization of normal butane. A further object is to provide a process for the production of isobutane from normal butane in which a liquid catalyst of the aluminum chloride complex type is employed. It is also an object of our invention to provide a process for the production of isobutane from which high yields of product per unit of catalyst consumed are obtained. It is an object of our invention to provide a truly continuous process for the conversion of n-butane to isobutane. It is an object of our invention to provide a process giving a high and relatively constant conversion of n-butane to isobutane. It is an object of our invention to provide a process wherein the optimum activator concentration can be continuously employed. It is an object of our invention to provide an isomerization process which will give high once-through conversion of n-butane to isobutane. It is an object of our invention to provide a process for the isomerization of n-butane which can operate on the liquid phase. It is an object of our invention to provide an isomerization reactor wherein the heat of reaction can be readily dissipated. Finally it is an object of our invention to provide a process the catalyst of which is not appreciably susceptible to deactivation by small amounts of olefin and higher hydrocarbons. Further objects, advantages and uses of our invention will become apparent from the following detailed description read in conjunction with the drawings which form a part of this specification and which show in a schematic manner systems suitable for carrying out our invention.

In one of its broad aspects our invention comprises treating hydrocarbon fractions containing a large proportion of normal butane in the presence of an aluminum chloride-hydrocarbon complex at a temperature of from about 120 to about 400° F. and at an elevated pressure, in the presence of an activator, with intermittent regeneration of the catalyst to a mobile liquid form or with addition of makeup aluminum chloride in solution to maintain catalyst activity.

The feed stock for our process can be a relatively pure normal butane, but, generally speaking, essentially saturated hydrocarbon fractions composed predominantly of the butanes and containing a large proportion of normal butane are preferred, since they are much more readily available. Suitable charging stocks, for example, are the butanes obtained by fractionating the natural gasoline recovered from natural gas or "distillate" wells by conventional methods or the residual gas from a catalytic polymerization, hydration or alkylation unit operated on a "plant butane" cut, the olefins in the cut being substantially completely removed by the polymerization or alkylation. The butane fraction charged is preferably substantially completely saturated, i. e. free from olefins, and it is also substantially free from moisture.

The active liquid aluminum halide-hydrocarbon complex used in accordance with our invention may be prepared by the action of an aluminum halide, such as anhydrous aluminum chloride or aluminum bromide, and an activator affording a hydrogen halide on a substantially saturated fraction containing, for example, paraffin hydrocarbons at a temperature in the range from about 50° F. to about 225° F. or more. Such a complex catalyst may be prepared, for example, in the manner described in our U. S. Patent 2,300,249. Its activity may be measured by its heat of hydrolysis as determined by any well known calorimetric method. Note U. S. Patent 2,308,560.) In the case of aluminum chloride complexes such heats of hydrolysis are usually in the approximate range of 60 to 75 large calories per gram atom of active aluminum and in the case of aluminum bromide complexes such heat of hydrolysis is usually in the approximate range of 67 to 82 large calories per gram atom of active aluminum. By the expression "active aluminum" we mean the aluminum content of hydrolyzable aluminum compounds; i. e., this expression does not include the aluminum content of inactive compounds such as oxides and hydroxides. A complex prepared by the action of aluminum chloride and hydrogen chloride on a light naphtha from natural or straight-run gasoline substantially free from aromatic and olefinic hydrocarbons is eminently suitable for use in the initial starting-up of our process. Neither olefin complexes or aromatic or alkyl aromatic complexes (Gustavson complexes) are desirable. After the process is started it is only necessary to add make-up aluminum halide or effect continuous or periodic regeneration to maintain the catalyst at the desired level of activity.

Throughout the specification and claims whenever the terms "aluminum chloride-paraffinic hydrocarbon complex," "paraffinic complex," or similar expressions are employed they are intended to designate the liquid complex formed by the reaction of aluminum halide with a saturated hydrocarbon in accordance with a procedure of the general type described above. We also refer to our complex as containing "bound" hydrocarbons. This is to designate that the paraffinic hydrocarbon is joined to the aluminum halide by chemical means and to distinguish the catalyst from such catalysts as those comprising a slurry of an aluminum halide in a liquid hydrocarbon. However, since free aluminum chloride is appreciably soluble in aluminum chloride complex catalyst not all of the aluminum chloride is chemically bound to hydrocarbon. The complex preferably contains from about 16% to about 40% hydrocarbons based on the total catalyst on a weight percent basis. If desired, the catalyst can be fortified or maintained at desired activity by dissolving sufficient aluminum halide in the aluminum halide-hydrocarbon complex or in the normal butane feed.

The solubility of aluminum chloride in butane is approximately as follows:

| Temperature | Wt. percent of AlCl₃ dissolved | Lbs. of AlCl₃ per bbl. of butane |
| --- | --- | --- |
| 100° F | 0.01 | 0.02 |
| 150° F | .3 | .6 |
| 200° F | 1.5 | 3.1 |
| 212° F | 2.1 | 4.3 |
| 250° F | 5.5 | 11.3 |

Thus by simply controlling the amount and temperature of that portion of the butane charge which is passed through a solution tank, the quantity of make-up aluminum chloride may be regulated with great precision. The aluminum chloride-hydrocarbon catalyst exhibits great affinity for free aluminum chloride and hence extracts substantially completely dissolved aluminum chloride from the butane feed. By introducing the makeup at a rate within the approximate range of 0.1 to 1 pound per barrel or the more limited range of 0.2 to 0.5 pound per barrel of total butane charged, the added makeup is effectively removed from the solution by the complex and is not carried from the reaction zone in solution in the effluent product.

The above solubility data is based on substantially pure normal butane and fresh aluminum chloride. It has been found, however, that the rate of solubility decreases in time when the butane contains impurities due to an apparent contamination of the aluminum chloride. This can be compensated for easily by increasing the temperature of the butane and/or decreasing the rate of flow of the butane through the aluminum chloride tanks. Also the difficulty may be largely remedied by passing through the tanks recycle n-butane which has already been passed through the reactors.

The drawings which form a part of this specification are illustrative of two types of systems according to the present invention.

Figure 2:
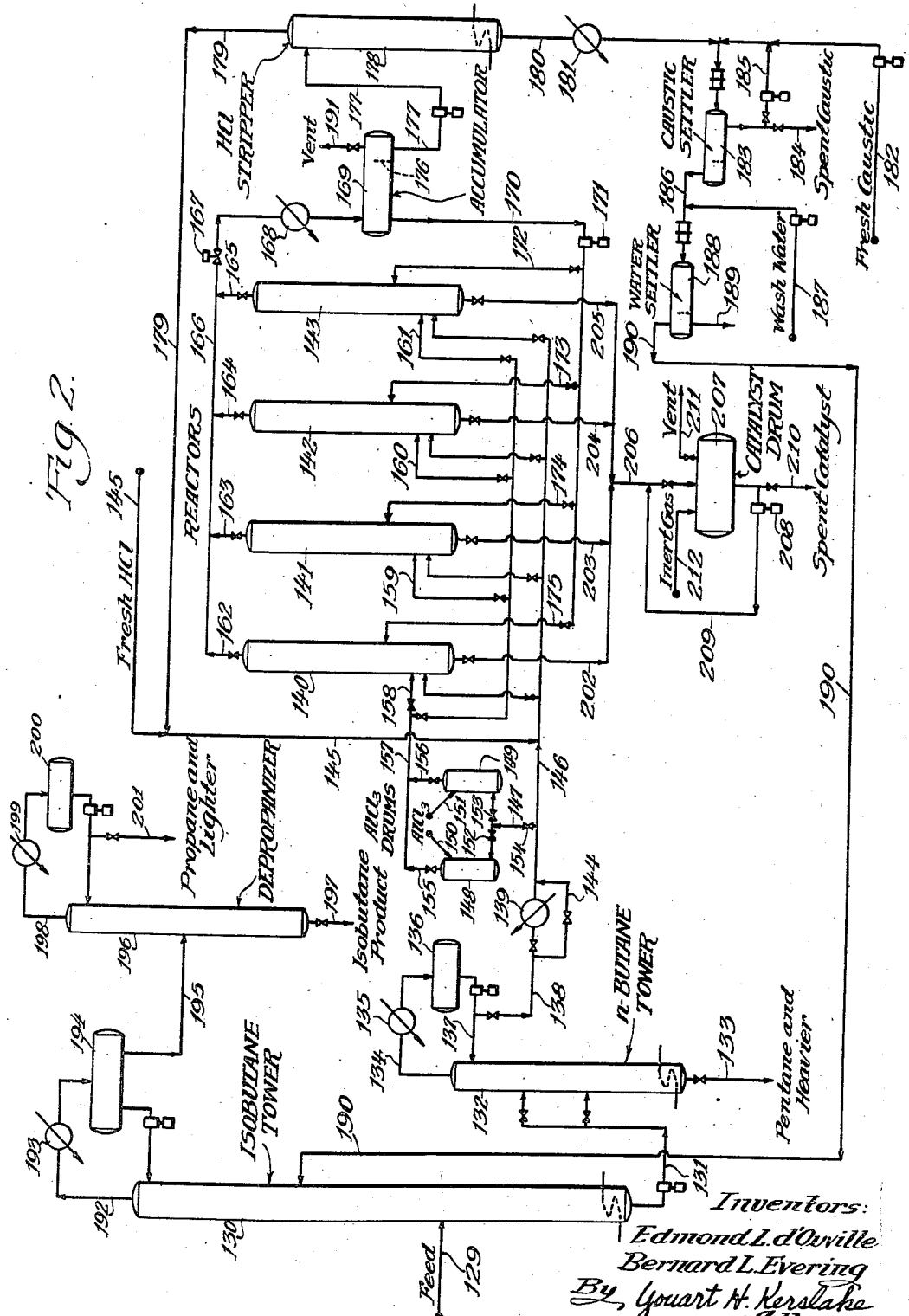

Figure 1 is a flow sheet of a system for carrying out the invention by adding make-up aluminum halide in complex; and Figure 2 is a flow sheet of a system for practicing the invention by adding make-up aluminum halide in at least a part of the entering butane stream.

Referring now to Figure 1, a n-butane feed stock of the type described above enters mixing tank 10 through line 11 under pressure imposed by the aid of pump 12. An activator such as an hydrogen halide or a compound affording an hydrogen halide under the reaction conditions enters mixing tank 10 through line 13 and pump 14. As an activator we prefer to employ an hydrogen halide such as the chloride or bromide although we may use materials which yield hydrogen halide during the reaction.

Wherever the term "activator affording an hydrogen halide" or a similar expression is used throughout the specification and claims, it is intended to include not only such substances as alkyl halides, organic chlorides and chlorine, but also the hydrogen halides themselves. For the sake of simplicity the process will be described relative to the use of hydrogen chloride, our preferred activator. In mixing tank 10 the normal butane feed is partially saturated with hydrogen chloride or other activator until the concentration of hydrogen halide, based on the total feed, lies between about 0.1% and about 20% or preferably between about 3% and 6% by weight. The butane and hydrogen chloride in liquid phase are then pumped through line 15 and line 16 having valve 17 therein to isomerizer 18. Although our process can operate in either the vapor or liquid phase, the reaction is preferably carried out with the reactants in the liquid phase, and the pressure can lie within the range from about 100 to about 2000 pounds per square inch, depending to a large extent upon the temperature at which the reactor is maintained. A preferred pressure will be in the general vicinity of about 500 pounds per square inch, i. e. about 300 to 600 pounds per square inch.

Isomerizer 18 can be a reactor in the form of an elongated tower 19 topped by a comparatively short wide section 20. Other types of isomerization reactors such as those having mechanical mixing means therein or comprising elongated coils, etc., can be substituted if desired, and it is equally feasible to employ a tower having the same diameter throughout its length, leaving the upper part free of catalyst to act as a "settling section" or a separate separator can be employed for this purpose. The narrow part of the tower 19 is filled with catalyst of the type described approximately to the point where the narrow portion 19 expands to form the enlarged section 20. With a tower of uniform diameter the complex may extend to a relatively high level therein, i. e. the tower may be about ½ to ¾ full of complex. The column of complex in the tower should be at least five feet deep and preferably twenty to thirty feet deep or more. Since the top of the column of complex is below the level at which reaction products are withdrawn and since the amount of make-up catalyst added and spent catalyst withdrawn is quite small, the column of complex in the reaction zone is relatively stationary. The term "relatively stationary" does not mean quiescent because there will of course be a certain amount of turbulence within the column itself. The term "relatively stationary" means rather that the catalyst column is relatively fixed or stationary with regard to charging stock flow as distinguished from concurrent and countercurrent flow respectively.

The isomerization reaction is carried out at temperatures within the range from about 120° F. to about 400° F., preferably about 212° F. Heat can be supplied by passing the butane and hydrogen chloride solution through a heater 21 in line 15 and/or by the use of a heating jacket or other heating means 22 about section 19 of isomerizer 18, any suitable heating medium entering through line 23 and being discharged through line 24. Only the lower part of the tower need be jacketed for temperature control, and the whole tower covered by effective insulating material, or the heating jacket can extend about the enlarged section as well as the narrow section, depending upon whether it is deemed preferable to maintain the entire reactor at approximately the same temperature or to have the two sections at different temperatures. Catalyst is added through line 25 and line 26 having valve 27 therein to the upper portion of tower 19 while the reactants enter near the base of this tower through a spraying means 28 or other means for dispersing the reactants through and in intimate contact with the liquid catalyst if it appears desirable.

In order to maintain the activity of the aluminum halide-paraffinic hydrocarbon complex, the complex can, if desired, be by-passed from line 25 through line 122 and heater 123 to a tower 124 containing beds of solid aluminum chloride. Valve 125 in line 122 is open and valve 126 in line 25 is closed. In heater 123 the complex is heated to such a temperature that just sufficient aluminum chloride is dissolved to maintain the catalyst at the desired activity and the complex is allowed to flow over or otherwise contact the solid aluminum chloride in tower 124. Fresh aluminum chloride can be added to tower 124 via line 127. The fortified complex then passes from tower 124 through line 128 to line 25 at a point beyond valve 126.

The fortification of the complex may be controlled by means of valve 125, heater 123 and the quantity of solid aluminum chloride in tower 124 so that the amount of aluminum chloride taken up by the complex may be regulated to any desired amount. Usually it is desirable to introduce the fortified complex into the reaction zone in such amounts that about 0.1 to about 1 pound, preferably about .2 to .5 pound, of dissolved aluminum chloride is introduced into the reaction zone per barrel of charging stock introduced thereto.

The enlarged section 20 of isomerizer 18 can act as a "settling section" or separator allowing any mechanically occluded catalyst to separate out from the hydrocarbons and fall back into tower 19. The products from the isomerization reactor including unconverted normal butanes, any degradation products such as propane and lighter hydrocarbons, as well as hydrogen chloride, and isobutane pass overhead from isomerizer 18 through line 29 to line 30 having valve 31 therein through cooler 32 to separator 33. The "weight space velocity" in the reactor will vary widely depending on the activity of the catalyst, temperature of operation, and degree of isomerization required. In general it will fall within the limits of 0.1 to 100 pounds of butane per hour per pound of aluminum chloride in the reactor. The volume space velocity for catalysts of average activity (about 60 to 70 large calories per gram atom of active aluminum in the case of aluminum chloride) is within the approximate range of .2 to 4 volumes of liquid butane charged per hour per volume of complex in the reaction zone or column. The pressure in separator 33 can be substantially less than that in reactor 18, a pressure reducing valve 34 in line 30 being provided for this purpose.

Separator 33 diagrammatically illustrates a separation system for separating hydrogen chloride and gases on one hand and catalyst material on the other hand from the liquid product stream. While a single vessel is illustrated in the drawings it should be understood that any number of settling chambers, stripping columns, etc., may be employed for this purpose. Separator 33 may be operated at substantially reaction temperature and may act as a combined settler and stripper. The hydrogen chloride is taken overhead through line 35, valve 36 in vent line 37 is closed, valve 38 in line 39 is opened, and valve 40 is likewise open so that the hydrogen chloride is simply recycled to line 13. When the gases leaving the separator through line 35 contain undesirably large amounts of gaseous hydrocarbons, valve 40 may be closed, valve 41 opened and the gases thus passed through line 42 to separator 43 wherein by absorption means or other methods the hydrogen chloride may be separated from hydrocarbons. The hydrogen chloride can then be returned by line 44 and line 39 to line 13 and the hydrocarbons vented from the system through line 45.

When cooler 32 appreciably lowers the temperature, for example to 100° F. or lower, most of the hydrogen chloride may remain in solution in the liquid product but in this case light hydrocarbon gases may be purged from the system by closing valve 38 and opening valve 36 to vent line 37. In this case, however, a subsequent stripping of the hydrogen chloride out of the liquid product is desirable to avoid unduly large activator losses.

Any catalyst carried along mechanically or dissolved in the products can be recovered from separation system 33, the lower temperature serving to precipitate any dissolved aluminum chloride. Entrained complex together with precipitated catalyst accumulates as a liquid and may be withdrawn through line 46 either through valve 47 and line 48 or preferably through valve 49 and line 50 which joins line 25.

The isomerized product, together with unconverted normal hydrocarbons, is withdrawn from separator 33 through line 51 and passed through wash tower 52 wherein any last remaining traces of catalyst and/or hydrogen chloride are removed. Water or an alkali wash, which enters through line 53 and is discarded through line 54, can be employed. The washed products are withdrawn from wash tower 52 through line 55 and can be recovered as such by opening valve 56 in line 57. However, it is frequently desirable to recover the isobutane as a comparatively pure fraction and therefore the normal and isobutane mixture can be passed to fractionator 58 by opening valve 59 in line 60. Fractionator 58 is any conventional fractionating equipment for the separation of components of various boiling points and is provided with the necessary cooling and heating means for separating the normal butane from the isobutane. The desired isobutane passes overhead through line 61 to storage (not shown) while the normal butane is withdrawn through line 62 and can be recovered as such by opening valve 63 in line 64, but preferably is recycled to the isomerization reactor by opening valve 65 in line 66 which joins line 11. Any hydrocarbons heavier than butane can be withdrawn through line 62a and discarded or used otherwise as described.

We have thus far described our process as one employing a single reactor 18. However, it is often desirable for more complete conversion to employ the reactors in series. Accordingly, the products from line 29 can, if desired, be directed to isomerizer 67 by opening valve 68 in line 69 leading from line 29, valve 29a being closed. The products pass from line 70 to a dispersing means 71 in the elongated tower 72 of isomerizer 67, passing up through the catalyst pool to the enlarged portion 73. Catalyst can be added from line 25 by opening valve 74 in line 75. The products pass overhead from isomerizer 67 through line 76, valve 77 being open, to line 30 and the separator and fractionator previously described.

Another desirable mode of operation is to employ isomerizer 18 for the conversion of normal butane to isobutane until the catalyst therein is degraded to a point where it is no longer particularly effective for promoting the reaction. When this occurs valve 17 in line 16 can be closed and valve 78 in line 79 opened, directing the feed stock through line 70 to isomerizer 67. In this event, of course, valve 27 in line 26 will be closed, valve 74 in line 75 being opened. While isomerizer 67 is "onstream" the catalyst in isomerizer 18 can be regenerated and alternatively when isomerizer 18 is "onstream" the catalyst in isomerizer 67 can be regenerated.

The regeneration is preferably carried out by the use of hydrogen only in the presence of an hydrogen halide, if desired, at superatmospheric pressures. Hydrogen from any source enters through line 80 and is directed, for example, to the base of tower 19 by opening valve 81 in line 82. The temperatures employed for regeneration will lie within the range of from about 200° F. to about 350° F. and pressures of from about 500 to 1500 pounds per square inch are employed, preferably 600 pounds to 1000 pounds per square inch. A minor amount of hydrogen chloride can be added from line 83 by opening valve 84 if desired. During the regeneration of the catalyst in isomerizer 18 valve 31 in line 30 and valve 68 in line 69 will be closed while valve 85 in line 86 will be open to permit the escape of hydrogen, which can be returned to the hydrogen source (not shown). For the regeneration of the catalyst in isomerizer 67 hydrogen input line 87 with valve 88 is provided as well as hydrogen discharge line 89 having valve 90 therein. Regeneration per se is described in more detail in our U. S. Patent 2,293,891.

In another mode of operation the catalyst can be continuously or intermittently withdrawn from isomerizers 18 and/or 67 via lines 91 and 92, respectively, having valves 93 and 94 therein, to line 95 while fresh catalyst is continuously added from line 25. The spent catalyst can be discarded by opening valve 96 in line 97 but preferably is separately regenerated. To accomplish this, valve 98 in line 99 is opened, the catalyst passing through heater 100 to regenerator 101. Hydrogen is added from line 102 and hydrogen chloride from line 114, the same conditions of pressure and temperature being maintained in regenerator 101 as were previously set forth for regeneration of the spent catalyst in the reactors. No other promoters or regenerating agents are necessary, the hydrogen and hydrogen chloride alone serving to reactivate the complex to a liquid mobile form. The regenerated catalyst plus hydrogen is withdrawn from regenerator 101 which has been provided with a mixer 103 or other means for insuring contact between the hydrogen and the catalyst, through line 104 to separator 105, line 104 being provided with a pressure-reducing valve 106. The hydrogen, with or without hydrogen chloride, passes overhead through line 107 and can be discarded through line 108 by opening valve 109 or recycled by opening valve 110 in line 111 which joins line 102. Any hydrocarbons separated from the catalyst by the regeneration step can be discarded through line 112 while the regenerated catalyst is withdrawn through line 113 and directed to line 25 where it can be re-utilized in the process. In no case is the catalyst sludge regenerated to such an extent that pure aluminum chloride is formed, as has been suggested previously in the art. We prefer to use a catalyst in the form of a mobile complex and not as a pure aluminum halide.

It is also contemplated that when using the reactors in series the catalyst from one reactor may be directed to the other reactor, in the event that the catalyst is not substantially or completely spent when it is withdrawn from the reactor. Such a mode of operation is particularly advantageous if the reactors are maintained at different temperatures, reactor 67 being maintained in the lower portion of the temperature range described and reactor 67 in the upper portion of the range, for example. The higher temperature will allow the use of the catalyst to a greater degree of conversion per unit of catalyst, while the lower temperature permits a greater degree of conversion per volume of feed. A part or all of the partially spent catalyst can be directed from one reactor to another, and alternatively a part can be sent to one of the reactors and the remainder withdrawn for regeneration. This can be accomplished by opening valve 116 in line 115 which leads from lines 91 or 92 and sending the partially spent catalyst to the other reactor by opening valves 118 or 119 in lines 117 or 120, joining lines 26 and 75 respectively, valve 121 in line 95 being closed. By the proper adjustment of valves 116 and 121 a part of the catalyst can be routed as above described and a part withdrawn for regeneration. Ordinarily, withdrawal and recycle of the spent catalyst to the same reactor without intervening regeneration or aluminum chloride additives is not contemplated since it is expected that the catalyst will be retained within the reactor until it is no longer effective for promoting the isomerization reaction.

Another system for isomerizing normal butane is shown in Figure 2. In this figure the feed containing normal butane is introduced through line 129 to the isobutane tower 130 in which a separation is made between isobutane, propane and lower boiling hydrocarbons on the one hand which are withdrawn from the top of the tower 130 and normal butane, pentane and higher boiling hydrocarbons on the other hand which are withdrawn from the bottom of the tower 130 through line 131 to the normal butane tower 132. The effluent from tower 132 consists predominantly of normal butane although minor amounts of other saturated hydrocarbons can be tolerated. Pentane and higher boiling hydrocarbons are removed from the bottom of the normal butane tower 132 through line 133. The normal butane stream is passed through line 134 from the top of tower 132, through cooler 135 to drum 136. Part of the condensed normal butane stream may be returned as reflux to the normal butane tower through line 137 while the remainder is passed through line 138, heater 139 to any one or more of the reactors 140, 141, 142 and 143. If desired the normal butane stream may be by-passed around heater 139 through line 144. An activator affording hydrogen halide, such as hydrogen chloride per se is introduced through line 145 to the normal butane stream in line 146 where it is mixed with the normal butane in amounts of about 1 to 10% or preferably 3 to 6% by weight based on total butane charged. A portion of the normal butane is withdrawn from line 146 (prior to the point at which hydrogen chloride is added) through line 147 and passed through towers 148 and 149 which contain solid aluminum chloride. Additional aluminum chloride may be introduced into the towers 148 and 149 at 150 and 151 respectively. As shown in the drawings line 147 is provided with valves 152, 153 and 154 so that the portion of the normal butane may be passed through either one of the towers 148 and 149 or through both towers simultaneously. In the aluminum chloride towers the normal butane dissolves aluminum chloride in amounts controlled by temperature and amounts of butane passed therethrough and this solution passes through lines 155 and 156 to line 157 whence it is introduced into any one or more of the reactors 140, 141, 142 and 143 through lines 158, 159, 160 and 161 respectively. Obviously if desired the number of reactors may be increased or decreased depending upon the size of the reactors, the capacity of the system and other factors. The amount of aluminum chloride dissolved in the normal butane and hence the amount delivered to the reactors is regulated by the amount and temperature of the butane feed passing through the towers 148 and 149 so that the activity of the catalyst in the reactors may be controlled readily and easily. It is desirable to introduce from about 0.1 to 1 pound, usually about .2 to .5 pound of dissolved aluminum chloride into the reaction zone per barrel of total charging stock.

Each of the reactors 140, 141, 142 and 143 contains a column of aluminum chloride-hydrocarbon complex as described hereinbefore. Since the amount of make-up catalyst added and spent complex withdrawn is quite small, the column of complex in the reaction zone is relatively stationary. The term "relatively stationary" does not mean "quiescent" because there will of course be a certain amount of turbulence within the column itself. The term "relatively stationary" means rather that the catalyst column is relatively fixed or stationary with regard to charging stock flow as distinguished from concurrent and countercurrent flow respectively. This column should be at least about 5 feet in depth and should preferably be about 20 to 30 feet. As shown in the drawings the normal butane is introduced at a low point in the column while the make-up aluminum chloride dissolved in a portion of the butane feed is introduced at a higher point in the column. The conditions existing in the reactors are similar to those previously mentioned and are favorable to the isomerization of normal butane to isobutane; the pressure is sufficient to maintain liquid phase conversion conditions, i. e. is within the approximate range of 100 to 2000 pounds preferably about 300 to 600 pounds per square inch and the temperature is within the approximate range of 120° F. to 400° F., preferably about 200° to 250° F. As stated above we prefer to operate our process in the liquid phase although we may also operate in vapor phase. The space velocity with a catalyst of good activity should be within the approximate range of .2 to 4 volumes of total butane charged per hour (liquid basis) per volume of complex in the conversion zone. The vertical flow rate may be about 0.1 to 1 foot, e. g. about .5 foot per minute.

As in the case of the system illustrated in Figure 1 the butane stream passes upwardly through the reactors as a dispersed phase in a continuous complex phase. At a point near the top of the reactor the products of isomerization form a continuous phase and any catalyst complex which is carried into this phase will tend to settle out and return to the continuous complex phase in the lower part of the reactor. The products of reaction are removed from the top of the reactor through lines 162, 163, 164 and 165 and thence by line 166 through a pressure reducing valve 167, a cooler 168 to an accumulator 169 which may be operated within the range of about 90 to 150 pounds gage pressure and at a temperature of about 40 to 100° F.

Settled catalyst complex may be returned to the reactors through line 170, pump 171 and lines 172, 173, 174 and 175. That portion of the liquid products which passes over the baffle 176 in the accumulator 169 is pumped through line 177 to column 178 wherein the hydrogen halide activator is stripped. Column 178 may be operated at a pressure of about 450 with a top temperature of about 125° F. and a bottom temperature of about 270° F. The activator is withdrawn from the top of the stripping column 178 through line 179 and returned to the normal butane feed passing through line 146.

The bottoms from the stripping column 178 are withdrawn through line 180, cooler 181 and subsequently purified by caustic which may be introduced through line 182 and this mixture is passed through a mixer to a caustic settler 183 from which spent caustic may be withdrawn through line 184, or, if desired, in the case of only partially spent caustic, it may be recycled to the settler through line 185. The treated products are withdrawn from the caustic settler through line 186 admixed with wash water which is introduced through line 187 and passed through a mixer to a water settler 188 where a separation occurs; the water being withdrawn through line 189. The product which has thus been washed is passed via line 190 to the isobutane tower 130.

During the course of the isomerization reaction various gaseous products may be formed which must be vented from the system in order to prevent the accumulation thereof in the system. A vent is provided on the accumulator 169 and such gases may be removed from the system by line 191. The loss of hydrogen chloride with these gases will be very small because under the conditions in accumulator 169 the hydrogen chloride is chiefly dissolved in the liquid product stream.

The overhead from the isobutane tower 130 contains not only the isobutane produced by the system but also any isobutane which may be present in the feed in line 129. In addition, the overhead may contain propane. The overhead is withdrawn through line 192, condensed in cooler 193 and introduced into tank 194. A portion of the condensate may be pumped back to the isobutane tower as reflux while another proportion is passed through line 195 to the depropanizer 196. The bottoms from the depropanizer consist essentially of isobutane and can be withdrawn through line 197 to storage. The overhead from the depropanizer, consisting of propane and any lower boiling hydrocarbons that may be present, is withdrawn through line 198 and cooler 199 to reflux drum 200 from which a portion of the condensate may be returned to the depropanizer as reflux and another portion withdrawn through valved line 201.

The spent catalyst complex may be withdrawn from the reactors 140, 141, 142 and 143 through lines 202, 203, 204, 205 and line 206 to catalyst drum 207. Likewise active catalyst complex may also be withdrawn from any one or more of the reactors to the storage drums when occasion demands and such active catalyst may be returned to any one or more of the reactors by means of pump 208 and line 209 and thence through line 206 and lines 202, 203, 204 and/or 205. Spent catalyst complex may be withdrawn from the catalyst drum through line 210. When spent complex is withdrawn to drum 207 it passes through a pressure-reducing valve in line 206 which permits the escape of hydrogen chloride and hydrocarbon gases released by the reduction of pressure on the complex. These gases are vented through line 211. To prevent corrosion and coking in drum 207 the spent complex is protected from moisture and air by gas blanketing the drum with either dry inert or hydrocarbon gas introduced through line 212.

As an example of the process according to the present invention a plant stream consisting predominantly of normal butane was charged through line 129 at the rate of one gallon per hour for sixty hours to the isobutane tower 130. The bottoms comprising normal butane and higher boiling hydrocarbons were subsequently fractionated in tower 132. The normal butane stream which was taken overhead through line 134 and subsequently passed through line 138 was heated by heater 139 to a temperatures of approximately 170° F. This butane stream which includes recycle normal butane derived from line 190 is fed to the reactors at the rate of approximately 1.8 gallons per hour. Approximately 50% of the normal butane stream in line 146 is passed through the aluminum chloride drums 148 and 149 wherein a solution of aluminum chloride in normal butane is formed. During the 60 hour run .4 pound of aluminum chloride was dissolved by the normal butane. This is equivalent to a product yield of 105 gallons of isobutane per pound of make-up aluminum chloride. Hydrogen chloride was added to the normal butane stream through line 145 in an amount equal to 4.5 weight percent of reactor charge. The space velocity within the reactors was approximately 0.8. In order to effect the isomerization of the normal butane the reactors were maintained at a temperature of about 215° F. and at a pressure of about 400 pounds per square inch. The product stream in line 166 passes through the pressure reducing valve 167 to the accumulator 169. The conditions therein are maintained at approximately 90 to 100° F. and 290 pounds per square inch. After separation from any catalyst complex which may have been carried over the product stream is passed to the stripping column 178. This column was maintained at a pressure of about 300 pounds per square inch and had a top temperature of 95° F. and a bottom temperature of 235° F. In this case a recycle hydrogen chloride was sent to an adsorber. The bottoms from the stripping column were after purification returned to the isobutane tower 130. It was found that whereas the charging stock for the reactor contained only approximately 9% isobutane the product stream in line 190 contained approximately 48% isobutane. The overhead from the isobutane tower was stripped to remove lower boiling hydrocarbons and the isobutane product, containing 93% isobutane, was obtained.

While we have illustrated our invention by reference to the specific flow diagrams, it should be emphasized that these are by way of illustration only and not limitations on the scope of our invention. Moreover, for the sake of simplicity, various details have been omitted from the drawings and description, such as heat exchange features, pumps, valves automatic control means, etc., which omissions will be readily understood and supplied by one skilled in the art wishing to practice our invention.

We claim:

1. The method of producing isobutane which method comprises reacting a saturated hydrocarbon with aluminum chloride in the presence of hydrogen chloride under conditions for producing a liquid aluminum chloride hydrocarbon complex having a hydrocarbon content within the range of 16% to 40% by weight based on total complex, continuously contacting a charging stock consisting chiefly of normal butane and substantially free from olefins with said complex in the presence of a hydrogen halide activator under conversion conditions of temperature, pressure and space velocity for effecting isomerization, continuously separating hydrocarbon products from said complex at substantially conversion temperature and under a pressure sufficient to maintain at least a part of said product in a liquid phase, and adding make-up aluminum chloride to said complex employed in the contacting step at such a rate as to maintain the hydrocarbon content of the complex within the range of 16% to 40% by weight.

2. A process for the conversion of normal butane into isobutane which process comprises maintaining in a conversion zone a relatively stationary column of liquid aluminum chloride-paraffinic hydrocarbon complex at isomerization temperature and under sufficient pressure to maintain liquid phase conversion conditions in said coulmn, continuously introducing a normal butane charging stock at a low point into said column, introducing a hydrogen chloride activator into said column, passing charging stock as a dispersed phase upwardly through said column, continuously separating complex from butanes leaving the top of the column, continuously returning separated complex to the upper part of said column, continuously withdrawing separated butanes at a point above the top of said column and adding make-up aluminum chloride to the complex in amounts sufficient to maintain the hydrocarbon content of the complex within the range of about 16% to about 40% by weight.

3. The method of converting normal butane to isobutane which method comprises continuously introducing a normal butane charging stock at a low point in a relatively stationary column of liquid aluminum halide paraffinic hydrocarbon complex, introducing a small amount of a hydrogen halide activator into said column of complex, maintaining said column at a temperature effective for converting normal butane to isobutane and maintaining a column height sufficient to effect substantial conversion as the butane passes upwardly therethrough at a temperature below about 300° F. and at a pressure sufficient to maintain the butane in liquid phase, continuously removing reaction products at conversion pressure and in liquid phase from said relatively stationary column to a settling zone of sufficient cross-sectional area to permit the settling out of a substantial amount of entrained complex from liquid butanes leaving said column, adding make-up aluminum halide to said complex in amounts sufficient to maintain the hydrocarbon content of said complex within the range of about 16% to about 40% by weight separating activator and any residual catalyst from liquid reaction products and fractionating said products to obtain a fraction consisting essentially of isobutane.

4. The method of converting normal butane to isobutane which method comprises maintaining a column of liquid aluminum halide-paraffinic hydrocarbon complex in a reaction zone, incorporating an aluminum halide into said complex in amounts sufficient to maintain a hydrocarbon content in said complex within the range of about 16% to about 40% by weight, introducing a normal butane charging stock into said reaction zone at a first level at a low point in said column, said column extending from said first level up to a higher second level, introducing a hydrogen halide activator in said column, passing liquid charging stock upwardly through said column as a dispersed phase in said column of complex between said first level and said second level, maintaining a separation space in said reaction zone above said second level wherein complex may separate from upflowing liquid conversion products and be returned to said column of complex, withdrawing reaction products at a third level which is higher than said second level in said conversion zone and separating hydrogen halide and any residual catalyst from the withdrawn products.

5. The method of converting normal butane to isobutane which method comprises contacting in a reaction zone a normal butane charging stock substantially free from olefins with a liquid aluminum chloride-paraffinic hydrocarbon complex containing an amount of hydrocarbons within the range of about 16% to about 40% by weight based on total complex, effecting said contacting at a temperature within the range of 120° F. to 400° F. and under a pressure of at least about 100 pounds per square inch and sufficient to maintain a liquid hydrocarbon phase in said reaction zone, introducing hydrogen chloride into said reaction zone in amounts within the range of .1 to 20% by weight based on charging stock, employing a space velocity within the range of .1 to 100 pounds of butane per hour per pound of aluminum chloride in the reactor, adding aluminum chloride to said complex in amounts sufficient to maintain the hydrocarbon content of said complex within said range of about 16% to about 40% during the conversion and removing catalyst and activator from reaction products.

6. The method of claim 5 wherein the conversion temperature is in the general vicinity of about 200° F., wherein the conversion zone is under sufficient pressure to maintain substantially liquid phase conversion conditions, wherein make-up aluminum chloride is introduced to the reaction zone at the rate of about .1 to 1 pound per barrel of total charging stock introduced thereto, wherein hydrogen chloride is introduced into said conversion zone at the rate within the range of about 3% to 6% by weight based on total charging stock and wherein the space velocity is within the range of .2 to 4 volumes of charging stock per hour per volume of complex in the conversion zone.

7. The method of claim 5 wherein said contacting is effected by introducing said charging stock at the base of a column of liquid catalyst complex which is at least about 5 feet in height.

8. The method of claim 5 wherein said contacting is effected by introducing said charging stock at the base of a column of liquid catalyst complex which is within the range of 5 to 30 feet in height.

9. The method of producing isobutane which method comprises continuously dispersing a charging stock stream consisting chiefly of normal butane and substantially free from olefins at a low level into a relatively stationary column of liquid aluminum halide-paraffinic hydrocarbon complex in a conversion zone, employing in said column a complex having at least 16% by weight but not more than 40% by weight of hydrocarbon component in its composition, adding hydrogen halide activator to said column, passing said dispersed charging stock upwardly through said column under conversion conditions of temperature, pressure and space velocity for effecting isomerization, fortifying the complex by addition of aluminum halide for maintaining its activity, separating hydrocarbons as a liquid phase from the column of complex, and continuously withdrawing separated hydrocarbons from the upper part of said conversion zone.

10. The method of producing isobutane which method comprises continuously dispersing a charging stock stream consisting chiefly of normal butane and substantially free from olefins at a low level in a relatively stationary column of liquid aluminum chloride-paraffinic hydrocarbon complex in a conversion zone, employing in said column a complex having at least 16% by weight but not more than 40% by weight hydrocarbon component in its composition, adding a hydrogen halide activator to the column, passing the dispersed charging stock upwardly through the column under conversion conditions of temperature, pressure and space velocity for effecting isomerization, fortifying said complex to maintain it in active state by adding aluminum chloride thereto, separating hydrocarbons as a liquid phase from the column of complex and continuously withdrawing a hydrocarbon stream from the upper part of said conversion zone.

11. The method of claim 10 wherein the rate of aluminum chloride addition is within the range of .1 to 1 lb. per barrel of stock charged.

12. The method of claim 10 wherein the rate of aluminum chloride addition is such as to maintain in the composition of the complex at least about 16% but not more than about 40% by weight of hydrocarbon components.

13. The method of producing isobutane which comprises continuously passing a charging stock consisting chiefly of normal butane and substantially free from olefins upwardly through a column of liquid aluminum chloride-paraffinic hydrocarbon complex in the presence of added hydrogen chloride at a temperature, pressure and space velocity for effecting isomerization under liquid phase conversion conditions, producing said complex by reaction of aluminum chloride in the presence of hydrogen chloride with a saturated hydrocarbon which is substantially free from olefins and aromatics and by employing an amount of reactants in said complex producing step so that the complex in the isomerizing step will have a hydrocarbon content within the range of 16% to 40% by weight based on total complex, and maintaining the activity of the complex during the continuous passage of charging stock therethrough by adding make-up aluminum chloride to said complex.

EDMOND L. D'OUVILLE.
BERNARD L. EVERING.